(12) United States Patent
Helland

(10) Patent No.: US 10,350,608 B2
(45) Date of Patent: Jul. 16, 2019

(54) IN-FEED SYSTEMS FOR CHIPPERS OR GRINDERS, AND CHIPPERS AND GRINDERS HAVING SAME

(71) Applicant: VERMEER MANUFACTURING COMPANY, Pella, IA (US)

(72) Inventor: Benjamin Helland, Pella, IA (US)

(73) Assignee: Vermeer Manufacturing Company, Pella, IA (US)

( * ) Notice: Subject to any disclaimer, the term of this patent is extended or adjusted under 35 U.S.C. 154(b) by 599 days.

(21) Appl. No.: 15/145,653

(22) Filed: May 3, 2016

(65) Prior Publication Data

US 2017/0320067 A1 Nov. 9, 2017

(51) Int. Cl.
*B02C 25/00* (2006.01)
*B02C 18/14* (2006.01)
*B02C 18/22* (2006.01)
*A01G 3/00* (2006.01)

(52) U.S. Cl.
CPC .............. *B02C 25/00* (2013.01); *A01G 3/002* (2013.01); *B02C 18/14* (2013.01); *B02C 18/225* (2013.01); *B02C 18/2283* (2013.01); *B02C 2201/066* (2013.01)

(58) Field of Classification Search
CPC ..... B02C 18/00; B02C 18/22; B02C 18/2225; B02C 18/2266; B02C 18/24; B02C 25/00; B27L 11/00
See application file for complete search history.

(56) References Cited

U.S. PATENT DOCUMENTS

| 3,542,302 | A | 11/1970 | Salzmann |
| 3,593,807 | A | 7/1971 | Klima |
| 3,623,320 | A | 11/1971 | Moore |
| 3,734,202 | A | 5/1973 | Gyongyosi |
| 3,779,323 | A | 12/1973 | Horten et al. |

(Continued)

FOREIGN PATENT DOCUMENTS

| GB | 607276 A | 8/1948 |
| GB | 843184 A | 8/1960 |

OTHER PUBLICATIONS

International Search Report and Written Opinion for Application No. PCT/US2018/046782 dated Oct. 26, 2018 (14 pages).

(Continued)

*Primary Examiner* — Matthew Katcoff
(74) *Attorney, Agent, or Firm* — Michael Best & Friedrich LLP

(57) ABSTRACT

An infeed system is provided for a chipper or grinder having a processing portion wherein an item is processed into smaller pieces. The infeed system is upstream of the processing portion and includes a feed roller, a first hydraulic motor in communication with the feed roller for selectively actuating the feed roller, a second hydraulic motor in communication with the feed roller for selectively actuating the feed roller, and a hydraulic pump for providing hydraulic fluid to the first and second motors. A directional control valve and a relational control valve are between the pump and the motors. The directional control valve allows the hydraulic fluid to operate the first and second motors in a forward direction and in a reverse direction, and the relational control valve allows the hydraulic fluid to operate the first and second motors in series and in parallel.

22 Claims, 14 Drawing Sheets

(56) References Cited

U.S. PATENT DOCUMENTS

| | | | |
|---|---|---|---|
| 3,836,122 A * | 9/1974 | Pierce, Jr. | B66D 1/14 |
| | | | 254/273 |
| 3,861,602 A | 1/1975 | Smith et al. | |
| 3,894,606 A | 7/1975 | Hunck et al. | |
| 3,903,697 A | 9/1975 | Snyder et al. | |
| 4,034,918 A | 7/1977 | Culbertson et al. | |
| 4,064,950 A | 12/1977 | Salmi et al. | |
| 4,271,914 A | 6/1981 | Dressel | |
| 4,368,391 A | 1/1983 | Hellouin de Menibus | |
| 4,442,877 A | 4/1984 | Uitermarkt | |
| 4,485,623 A | 12/1984 | Chichester et al. | |
| 4,585,042 A | 4/1986 | Hutson et al. | |
| 4,921,219 A | 5/1990 | Ottemann et al. | |
| 5,005,620 A | 4/1991 | Morey | |
| 5,088,532 A | 2/1992 | Eggers et al. | |
| 5,205,496 A | 4/1993 | O'Donnell et al. | |
| 5,211,015 A | 5/1993 | Schroeder | |
| 5,692,548 A | 12/1997 | Bouwers et al. | |
| 5,692,549 A | 12/1997 | Eggers | |
| 5,913,371 A | 6/1999 | Jenne | |
| 5,947,395 A | 9/1999 | Peterson et al. | |
| 5,975,443 A | 11/1999 | Hundt et al. | |
| 6,135,176 A | 10/2000 | Smith | |
| 6,138,932 A | 10/2000 | Moore | |
| 6,293,479 B1 | 9/2001 | Kaczmarski et al. | |
| 6,299,082 B1 | 10/2001 | Smith | |
| RE37,923 E | 12/2002 | Keating et al. | |
| 6,732,813 B1 | 5/2004 | Eklof | |
| 6,840,471 B2 | 1/2005 | Roozeboom et al. | |
| 7,011,258 B2 | 3/2006 | O'Halloran et al. | |
| 7,070,132 B1 | 7/2006 | Gassman | |
| 7,077,345 B2 | 7/2006 | Byram et al. | |
| 7,134,511 B2 | 11/2006 | Mayr et al. | |
| 7,213,779 B2 | 5/2007 | Roozeboom et al. | |
| 7,413,031 B2 | 8/2008 | Koch et al. | |
| 7,441,718 B2 | 10/2008 | Seaman et al. | |
| 7,441,719 B2 | 10/2008 | Verhoef et al. | |
| 7,546,964 B2 | 6/2009 | Bouwers | |
| 7,637,444 B2 | 12/2009 | Stelter et al. | |
| 7,780,102 B2 | 8/2010 | Majkrzak | |
| 7,938,154 B2 * | 5/2011 | Quirke | B27B 25/02 |
| | | | 144/34.1 |
| 7,954,736 B2 * | 6/2011 | Kallenbach | B02C 18/2283 |
| | | | 241/34 |
| 8,146,681 B2 | 4/2012 | Heemann et al. | |
| 8,387,377 B2 | 3/2013 | Loewe et al. | |
| 8,408,328 B2 | 4/2013 | Wrede et al. | |
| 8,684,291 B2 | 4/2014 | Galloway et al. | |
| 8,851,112 B2 | 10/2014 | Nelson | |
| 8,943,819 B2 | 2/2015 | Knussman | |
| 2002/0070301 A1 | 6/2002 | Stelter et al. | |
| 2007/0108323 A1 | 5/2007 | Chapman et al. | |
| 2008/0237377 A1 | 10/2008 | Majkrzak | |
| 2009/0020050 A1 | 1/2009 | Bange et al. | |
| 2009/0025947 A1 | 1/2009 | Peltonen | |
| 2009/0152386 A1 | 6/2009 | Stelter et al. | |
| 2009/0308067 A1 | 12/2009 | Meier et al. | |
| 2010/0001107 A1 | 1/2010 | Kallenbach | |
| 2010/0319335 A1 | 12/2010 | Schneider et al. | |
| 2011/0006142 A1 | 1/2011 | Galloway et al. | |
| 2012/0055715 A1 | 3/2012 | Wrede et al. | |
| 2012/0285157 A1 | 11/2012 | Okano et al. | |
| 2013/0061588 A1 | 3/2013 | Jagoda | |
| 2013/0111893 A1 | 5/2013 | Edward | |
| 2013/0213026 A1 | 8/2013 | Yamamoto et al. | |
| 2014/0031185 A1 | 1/2014 | Bradley et al. | |
| 2014/0076981 A1 | 3/2014 | Hessler | |
| 2014/0234130 A1 | 8/2014 | Yamaoka et al. | |
| 2015/0038201 A1 | 2/2015 | Brinkmann et al. | |
| 2015/0048188 A1 | 2/2015 | Harsia | |

OTHER PUBLICATIONS

PCT Application No. PCT/US2017/030647, International Search Report and Written Opinion, dated Nov. 28, 2017, 20 pages.
Befco Bushmaster BM6-800 chipper, disclosed at http://www.befco.com/products/bushmaster/bm6-800.html (admitted prior art).

* cited by examiner

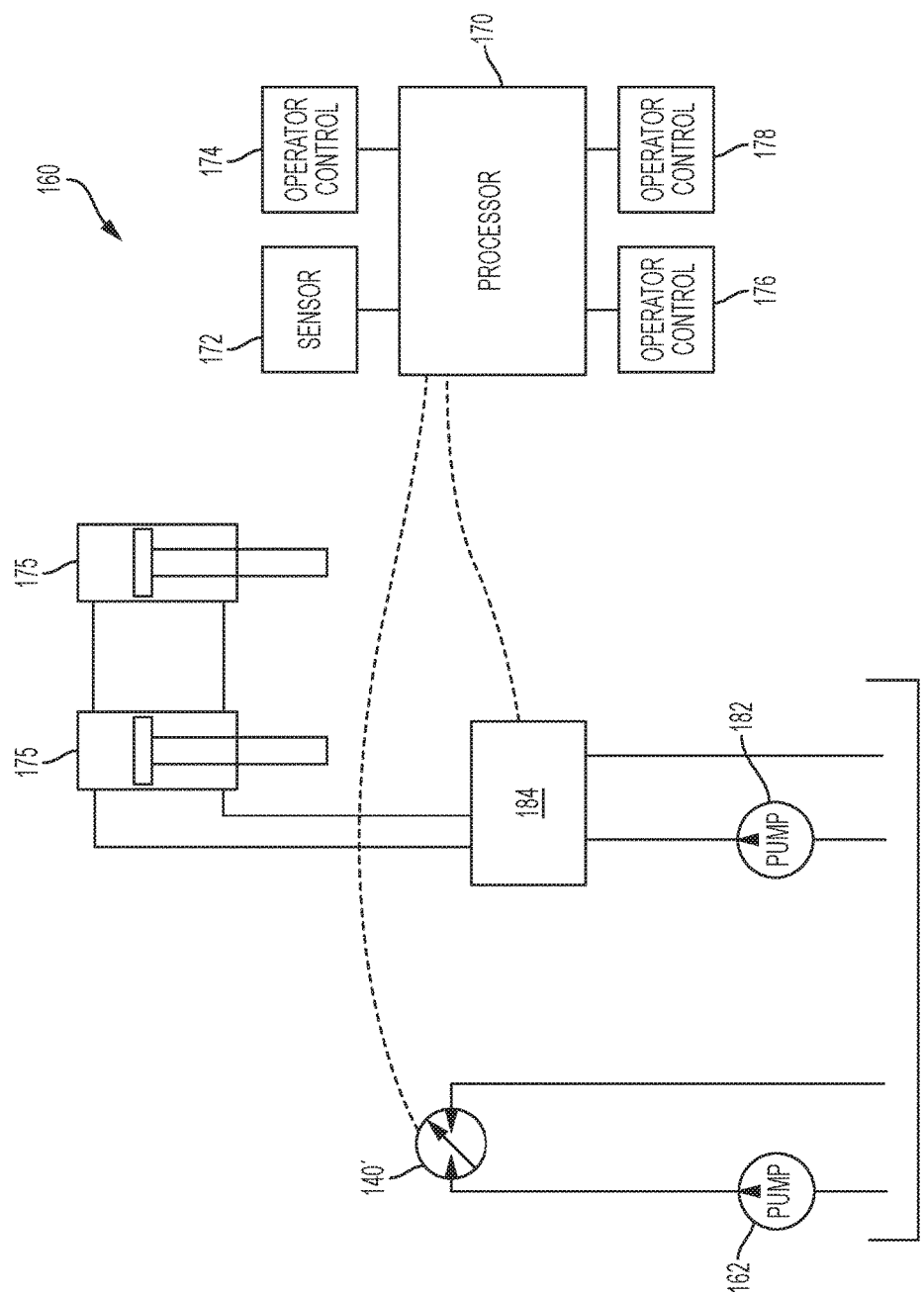

IN-FEED SYSTEMS FOR CHIPPERS OR GRINDERS, AND CHIPPERS AND GRINDERS HAVING SAME

BACKGROUND

The current invention relates generally to chippers and grinders, which are devices used to process items into smaller pieces. Chippers typically contain sharp knives that cut items such as whole trees and branches into smaller woodchips. Grinders, on the other hand, typically contain hammers which crush aggregate material into smaller pieces through repeated blows. Example prior art chippers are shown in U.S. Pat. Nos. 8,684,291; 7,637,444; 7,546,964; 7,011,258; 6,138,932; 5,692,549; 5,692,548; 5,088,532; and 4,442,877; and US 2014/0031185, each owned by Vermeer Manufacturing Company; these documents are each incorporated herein by reference in their entirety and form part of the current disclosure. Example grinders are disclosed in U.S. Pat. Nos. 7,441,719; 7,213,779; 7,077,345; and 6,840,471, each owned by Vermeer Manufacturing Company; these patents are each incorporated herein by reference in their entirety and form part of the current disclosure as well.

Chippers and grinders often include in-feed systems for moving items to the knives or hammers to be processed. Some embodiments of the current invention relate particularly to improved in-feed systems for chippers and grinders, to chippers and grinders having such improved in-feed systems, and to methods of operation.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere.

According to one embodiment, an infeed system is provided for a chipper or grinder having a processing portion wherein an item is processed into smaller pieces. The infeed system is upstream of the processing portion and includes a feed roller, a first hydraulic motor in communication with the feed roller for selectively actuating the feed roller, a second hydraulic motor in communication with the feed roller for selectively actuating the feed roller, and a control system for selectively providing hydraulic fluid to the first and second hydraulic motors in series and in parallel.

According to another embodiment, an infeed system is provided for a chipper or grinder having a processing portion wherein an item is processed into smaller pieces. The infeed system is upstream of the processing portion and includes a feed roller, a first hydraulic motor in communication with the feed roller for selectively actuating the feed roller, a second hydraulic motor in communication with the feed roller for selectively actuating the feed roller, and a hydraulic pump for providing hydraulic fluid to the first and second hydraulic motors. A directional control valve and a relational control valve are between the hydraulic pump and the first and second hydraulic motors. The directional control valve allows the hydraulic fluid to operate the first and second hydraulic motors in a forward direction and in a reverse direction, and the relational control valve allows the hydraulic fluid to operate the first and second hydraulic motors in series and in parallel.

According to still another embodiment, a chipper or grinder includes a processing portion wherein an item is processed into smaller pieces and an infeed system upstream of the processing portion. The infeed system includes a feed roller, a first hydraulic motor in communication with the feed roller for selectively actuating the feed roller, a second hydraulic motor in communication with the feed roller for selectively actuating the feed roller, and a hydraulic pump for providing hydraulic fluid to the first and second hydraulic motors. A directional control valve and a relational control valve are between the hydraulic pump and the first and second hydraulic motors. The directional control valve allows the hydraulic fluid to operate the first and second hydraulic motors in a forward direction and in a reverse direction, and the relational control valve allows the hydraulic fluid to operate the first and second hydraulic motors in series and in parallel.

According to yet another embodiment, an infeed system is provided for a chipper or grinder having a processing portion wherein an item is processed into smaller pieces. The infeed system is upstream of the processing portion and includes a feed roller, a hydraulic motor in communication with the feed roller for selectively actuating the feed roller, and a control system. The control system selectively actuates the motor at a first operational mode and a second operational mode. The motor has an increased speed output when at the first operational mode relative to when at the second operational mode, and the motor has a decreased torque output when at the first operational mode relative to when at the second operational mode. The control system automatically switches from the first operational mode to the second operational mode when an amount of down pressure applied on the feed roller is increased.

BRIEF DESCRIPTION OF THE DRAWINGS

FIG. 12 is a schematic view of part of the infeed system from an alternate embodiment of the chipper of FIG. 1 or the grinder of FIG. 10.

DETAILED DESCRIPTION

Figure 1:
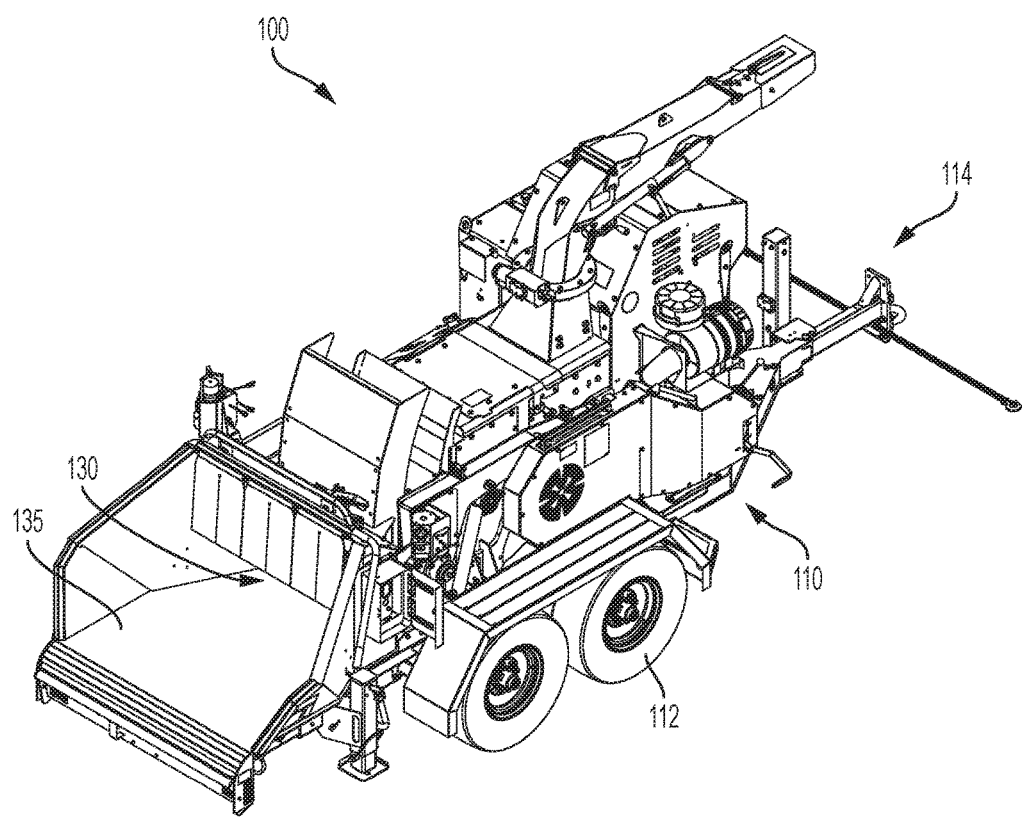
FIG. 1 is a perspective view of a chipper according to one embodiment of the current invention.

FIGS. 1 through 9*c* illustrate a chipper 100, according to one embodiment. The chipper 100 includes a processing portion 120 for processing an item into smaller pieces and an infeed portion 130 for feeding the item to the processing portion 120. A frame 110 supports (and may form part of) the processing portion 120 and the infeed portion 130, and the frame 110 may further include wheels 112 and a hitch 114 to allow travel and transport of the chipper 100. Mobility may not be desirable in all cases, however, and stationary embodiments are clearly contemplated herein.

The processing portion 120 (FIG. 2) includes a cutting mechanism such as a chipping or cutting drum or a disk cutter. Cutting mechanisms are well known, and any appropriate cutting mechanism (whether now known or later developed) may be used to process an item into smaller pieces.

The infeed portion 130 is upstream of the processing portion 120 and includes a feed roller 132 (FIGS. 3-7). First and second hydraulic motors 140, 150 (FIGS. 6-8) are each in communication with the feed roller 132 for selectively actuating the feed roller 132, and a control system 160 selectively provides hydraulic fluid to the motors 140, 150 in series and in parallel. More particularly, the control system 160, best shown in FIG. 8a, includes a hydraulic pump 162, a directional control valve 164, and a relational control valve 166. The pump 162 provides hydraulic fluid to the motors 140, 150, and the directional control valve 164 and the relational control valve 166 are each positioned between the hydraulic pump 162 and the motors 140, 150, such that fluid from the pump 162 passes the valves 164, 166 before reaching the motors 140, 150. The directional control valve 164 allows the hydraulic fluid to operate the first and second hydraulic motors 140, 150 in a forward direction and in a reverse direction; and the relational control valve 166 allows the hydraulic fluid to operate the first and second hydraulic motors 140, 150 in series and in parallel. The directional control valve 164, the relational control valve 166, and/or another valve may selectively prevent the hydraulic fluid from operating the motors 140, 150 as well. It may be particularly desirable for the motors 140, 150 to be fixed displacement motors, as fixed displacement motors may be cost effective and operating the feed roller 132 at a constant speed may typically be desirable for producing a consistent chip output from the chipper 100.

A processor (or "controller") 170 may operate the pump 162 and the valving (e.g., the directional control valve 164 and the relational control valve 166) to provide the hydraulic fluid to the motors 140, 150 in series; to provide the hydraulic fluid to the motors 140, 150 in parallel; and to prevent the hydraulic fluid from operating the motors 140, 150. Operating the motors 140, 150 in series may cause the feed roller 132 to rotate at roughly twice the speed at which the feed roller 132 rotates when the motors 140, 150 are operated in parallel. But torque of the feed roller 132 when the motors 140, 150 are operated in series may be roughly one half the torque of the feed roller 132 when the motors 140, 150 are operated in parallel. Thus, by altering the motors 140, 150 from operating in series and in parallel, the speed and torque of the feed roller 132 may be adjusted.

Figure 3:
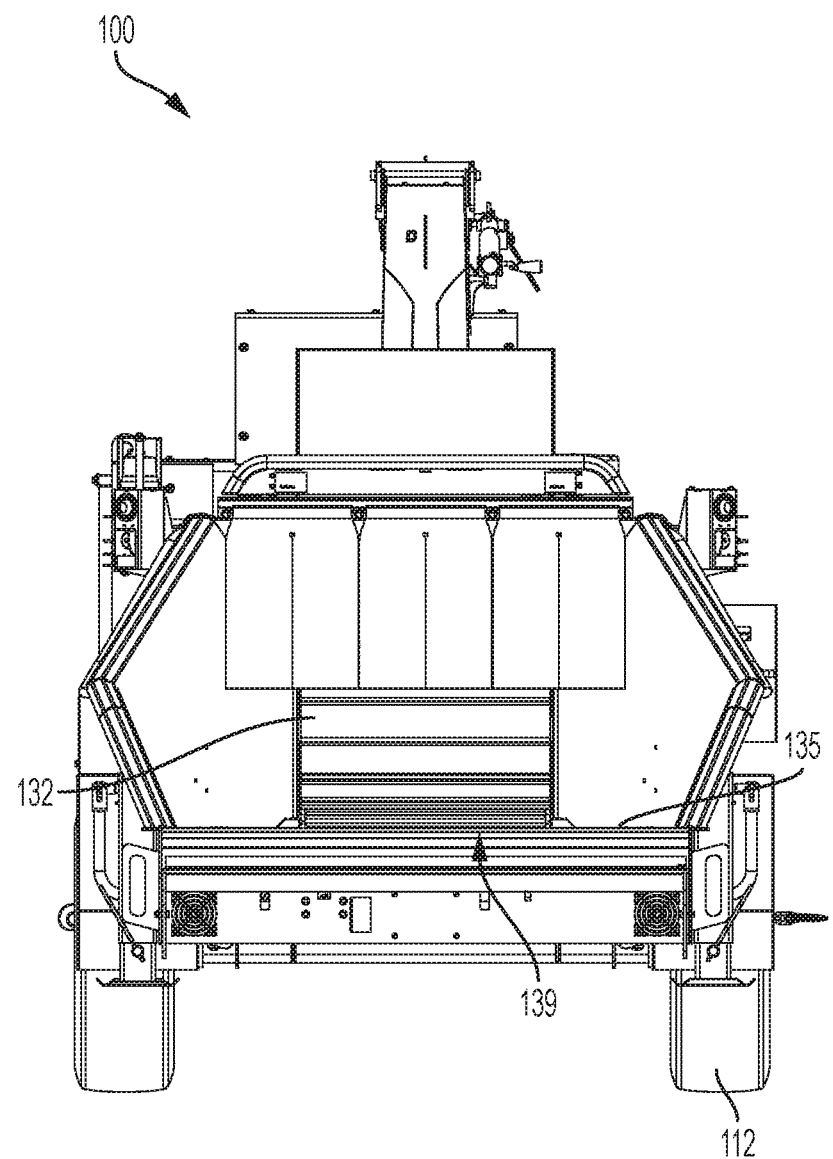
FIG. 3 is a rear view of the chipper of FIG. 1.
Figure 4:
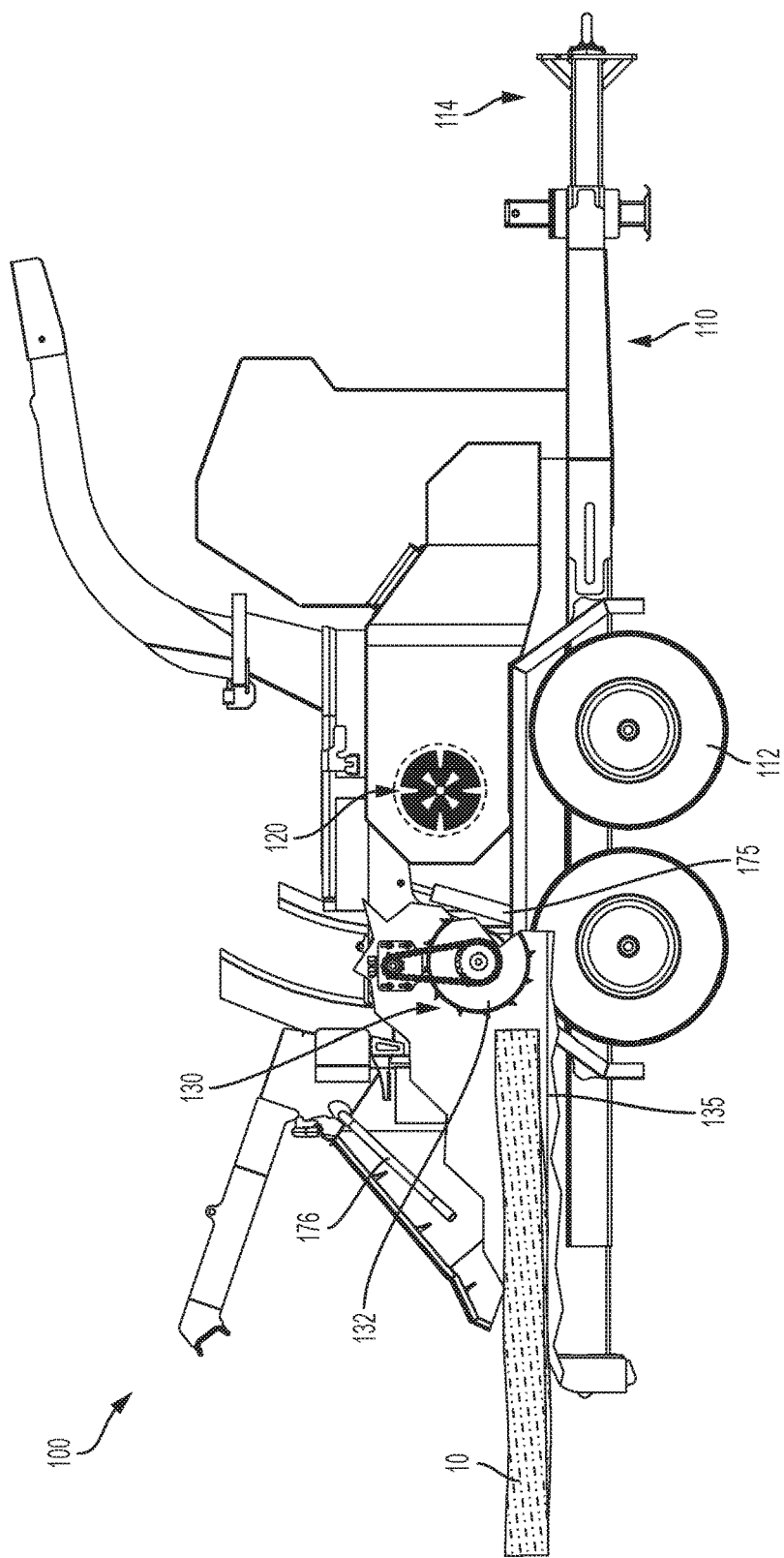
FIG. 4 is a side view of the chipper of FIG. 1, in use with a log and with a cutaway for illustration.
Figure 5A:
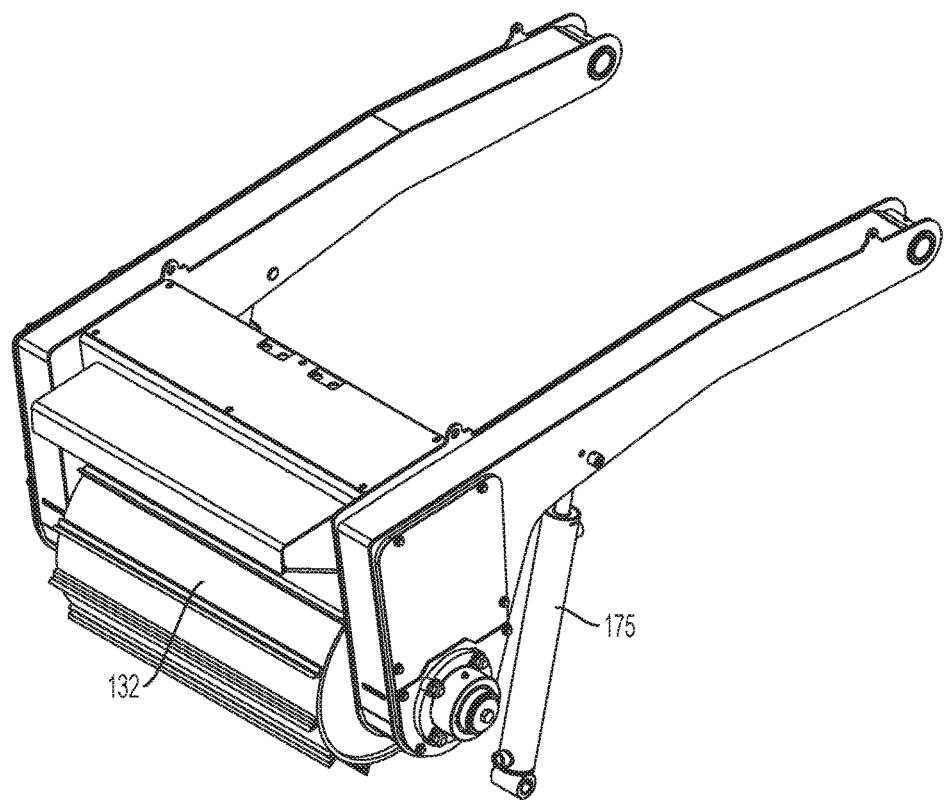
FIG. 5*a* is a perspective view of part of an infeed system from the chipper of FIG. 1.
Figure 5B:
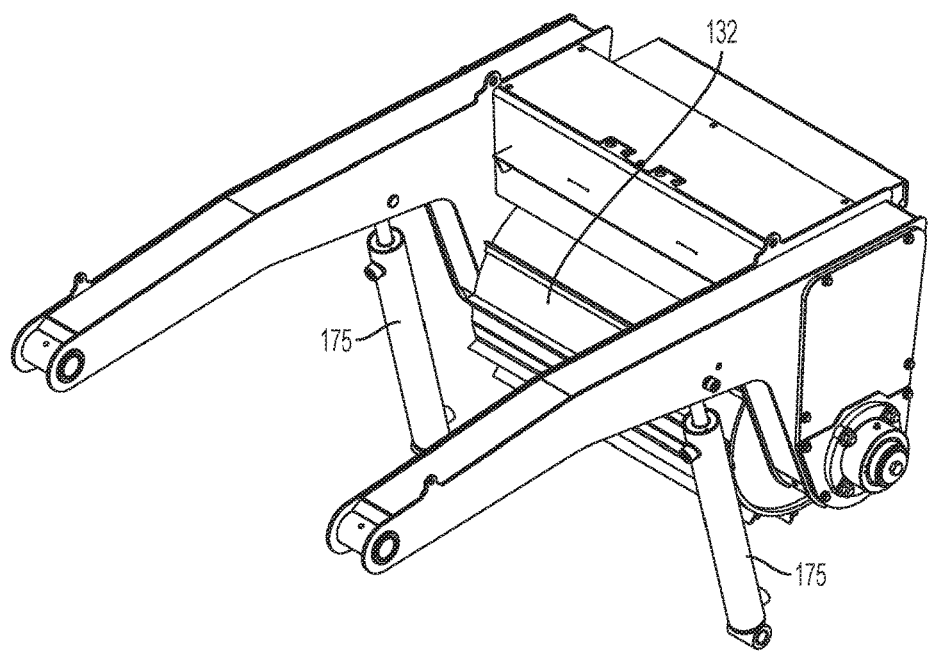
FIG. 5*b* is another perspective view of part of the infeed system from the chipper of FIG. 1.
Figure 6:
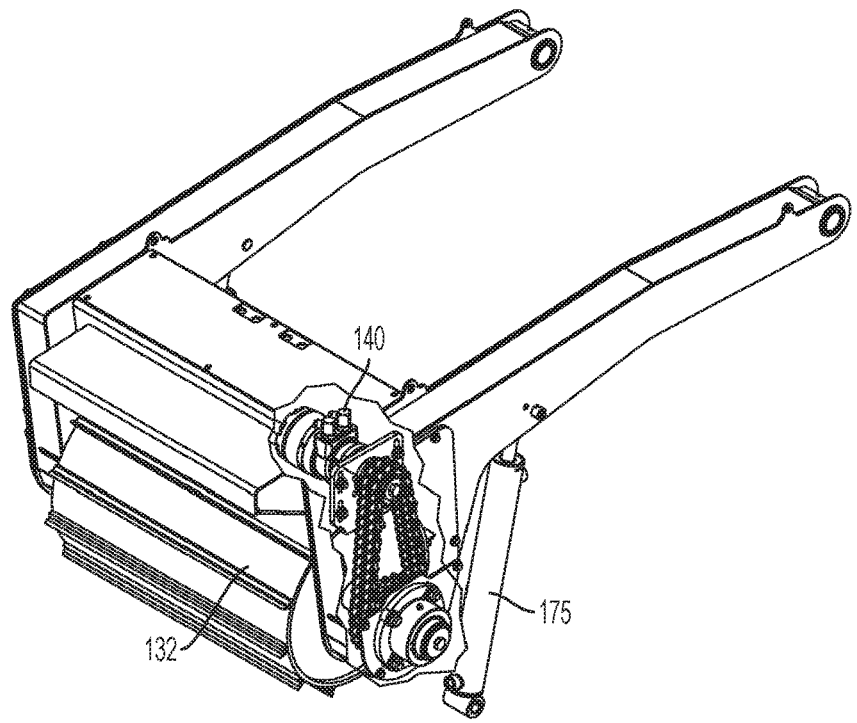
FIG. 6 shows the view of FIG. 5*a*, with covering removed for illustration.
Figure 7:
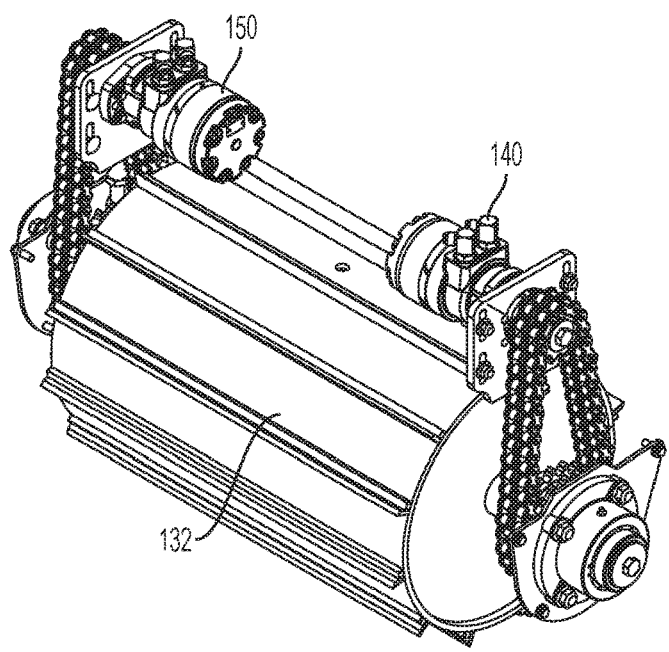
FIG. 7 shows the view of FIG. 6, with portions removed for illustration.

Attention is now directed to FIGS. 1, 3, and 4, which show that the infeed portion 130 may further include an infeed floor 135. In some embodiments, the feed roller 132 is movable toward and away from the infeed floor 135, and output from a sensor 172 indicates the position of the feed roller 132. In embodiment 100, hydraulic cylinders 175 raise and lower the feed roller 132 relative to the infeed floor 135.

Another pump 182 (FIG. 8a) is shown providing hydraulic fluid to the hydraulic cylinders 175 (though the pump 162 could be used in some embodiments), and height control valving 184 changes direction of fluid flow to the cylinders 175 to selectively extend and contract the cylinders 175—and thus alter the height of the feed roller 132. The height control valving 184 may also sufficiently depressurize the cylinders 175 to allow the cylinders 175 (and thus the feed roller 132) to float. The processor 170 may operate the pump 182 and the valving 184 to control the height of the feed roller 132 relative to the infeed floor 135, such as discussed in further detail below. One of ordinary skill in the art will appreciate that many of the various electrical and mechanical parts discussed herein can be combined together or further separated apart. As a further example, the processor 170 may be separated into a plurality of discrete processors which jointly perform the processes and functions described herein, and which jointly form the processor 170.

Figure 8A:
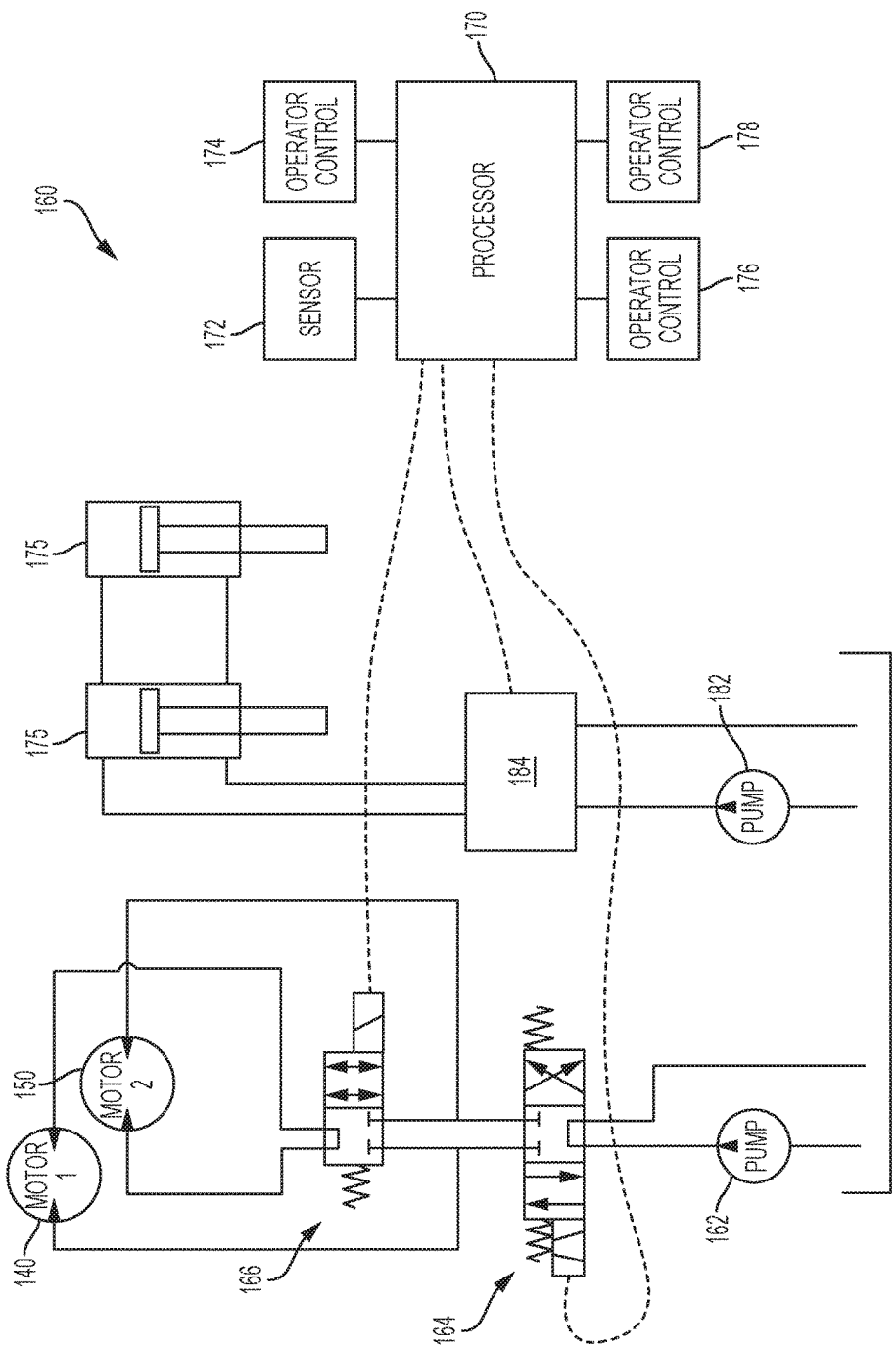
FIG. 8*a* is a schematic view of part of the infeed system from the chipper of FIG. 1.

Still referring to FIG. 8a, various operator controls 174, 176, 178 may additionally be in data communication with the processor 170. The operator controls 174, 176, 178 may, for example, be levers, switches, dials, buttons, or any other appropriate controls, whether now existing or later developed. In some embodiments, at least one of the operator controls 174, 176, 178 is not in direct physical communication with the processor 170, and instead communicates with the processor 170 wirelessly, such as through one or more of near-field, radio, or cellular communication technology.

The operator control 174 may cause the processor 170 to adjust the height of the feed roller 132 by extending or contracting the cylinders 175 (via the pump 182 and the height control valving 184), or may cause the processor 170 to allow the height of the feed roller 132 to float (via the valving 184). When chipping items such as trees and branches, it can be important for the feed roller 132 to apply a sufficient crush force (or "down pressure") on the tree or branch such that the tree or branch is moved toward the processing portion 120. Moving the feed roller 132 toward the infeed floor 135 may increase the amount of crush force applied, while moving the feed roller 132 away from the infeed floor 135 may decrease the crush force.

Figure 9A:
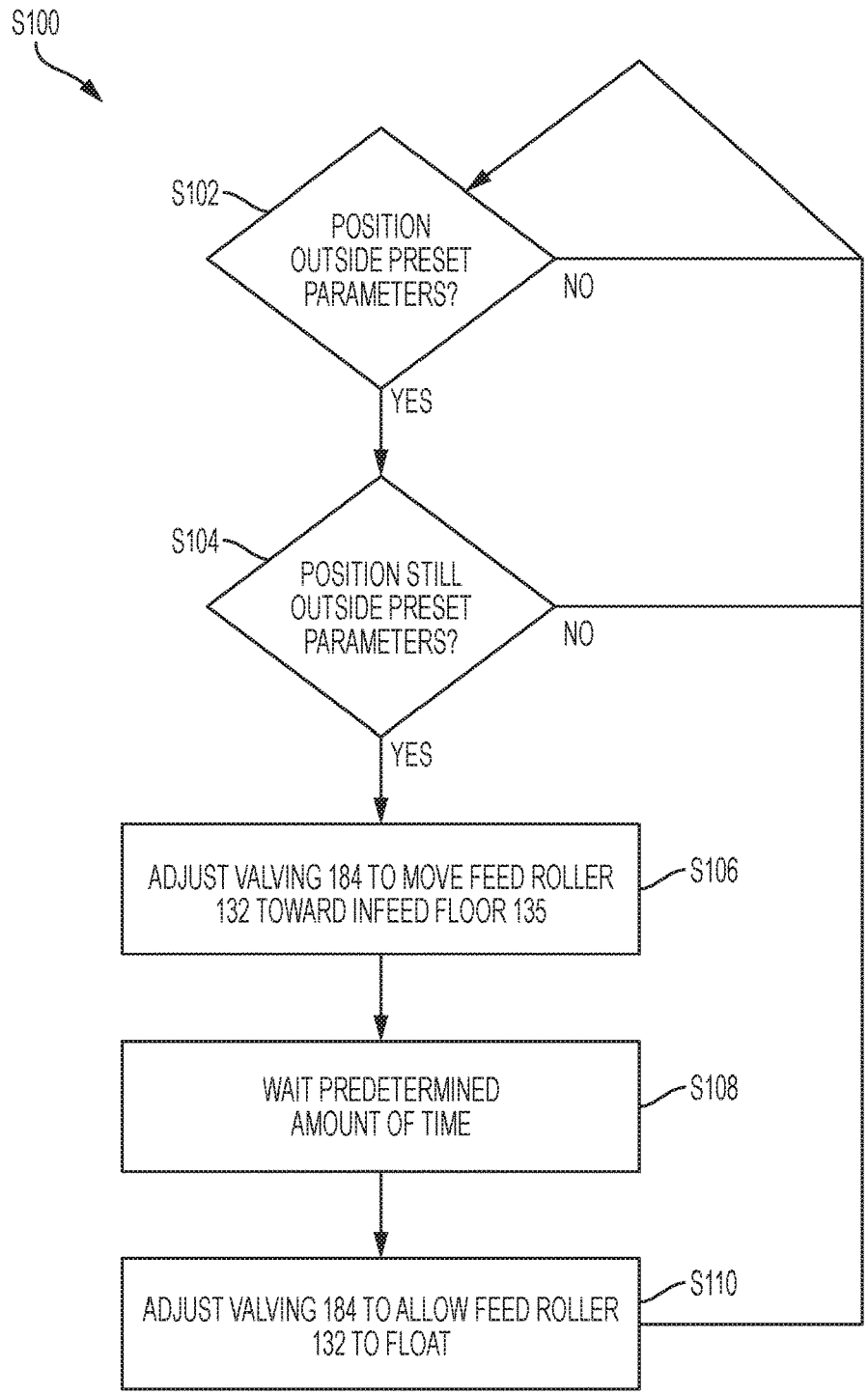
FIGS. 9*a* through 9*c* show example logic used by the processor in the chipper of FIG. 1.

In some embodiments, the processor 170 allows the cylinders 175 and the feed roller 132 to float only within certain parameters, and automatically alters the valving 184 to move the roller 132 toward the infeed floor 135 when those parameters are not met as desired. FIG. 9a shows example logic used by the processor 170, with process S100 starting at step S102, where the processor 170 uses position information from the sensor 172 to determine if the feed roller 132 is positioned outside of preset float parameters. This may occur, for example, if a branch extending from a tree being input through the infeed portion 130 sticks out and is sufficiently immovable to cause the feed roller 132 to raise. If the feed roller 132 is not positioned outside of the preset float parameters at step S102, the process S100 returns to step S102 to check again. If the feed roller 132 is positioned outside of the preset parameters at step S102, the process S100 continues to step S104.

At step S104, the processor 170 again uses position information from the sensor 172 to determine if the feed roller 132 is still positioned outside the preset float parameters. While step S104 may be omitted, it may be beneficial for filtering out brief jumps by the feed roller 132 for which the feed roller 132 does not need to be lowered. Additional filtering logic may also be employed at step S104, such as determining how many times the feed roller 132 is outside the preset float parameters in a given amount of time, determining how far the feed roller 132 moves outside the preset float parameters, et cetera. If the feed roller 132 is not undesirably outside the preset float parameters at step S104, the process S100 returns to step S102. If the feed roller 132 is undesirably outside the preset float parameters at step S104, the process S100 continues to step S106.

At step S106, the processor 170 adjusts the valving 184 to move the feed roller 132 toward the infeed floor 135 by actuating the cylinders 175. The process S100 then waits a predetermined amount of time at step S108 and continues to step S110. At step S110, the processor 170 adjusts the valving 184 to again allow the feed roller 132 to float, and the process S100 returns to step S102. Because the process S100 occurs when the user has chosen (e.g., through the operator control 174) to allow the feed roller 132 to float, steps S108, S110 return the feed roller 132 to the float condition. If the user desires to maintain the feed roller 132 at a locked position at any particular height, that may be accomplished by inputting a lowering command or a raising command to the processor 170 (e.g., through output of the operator control 174).

Figure 2:
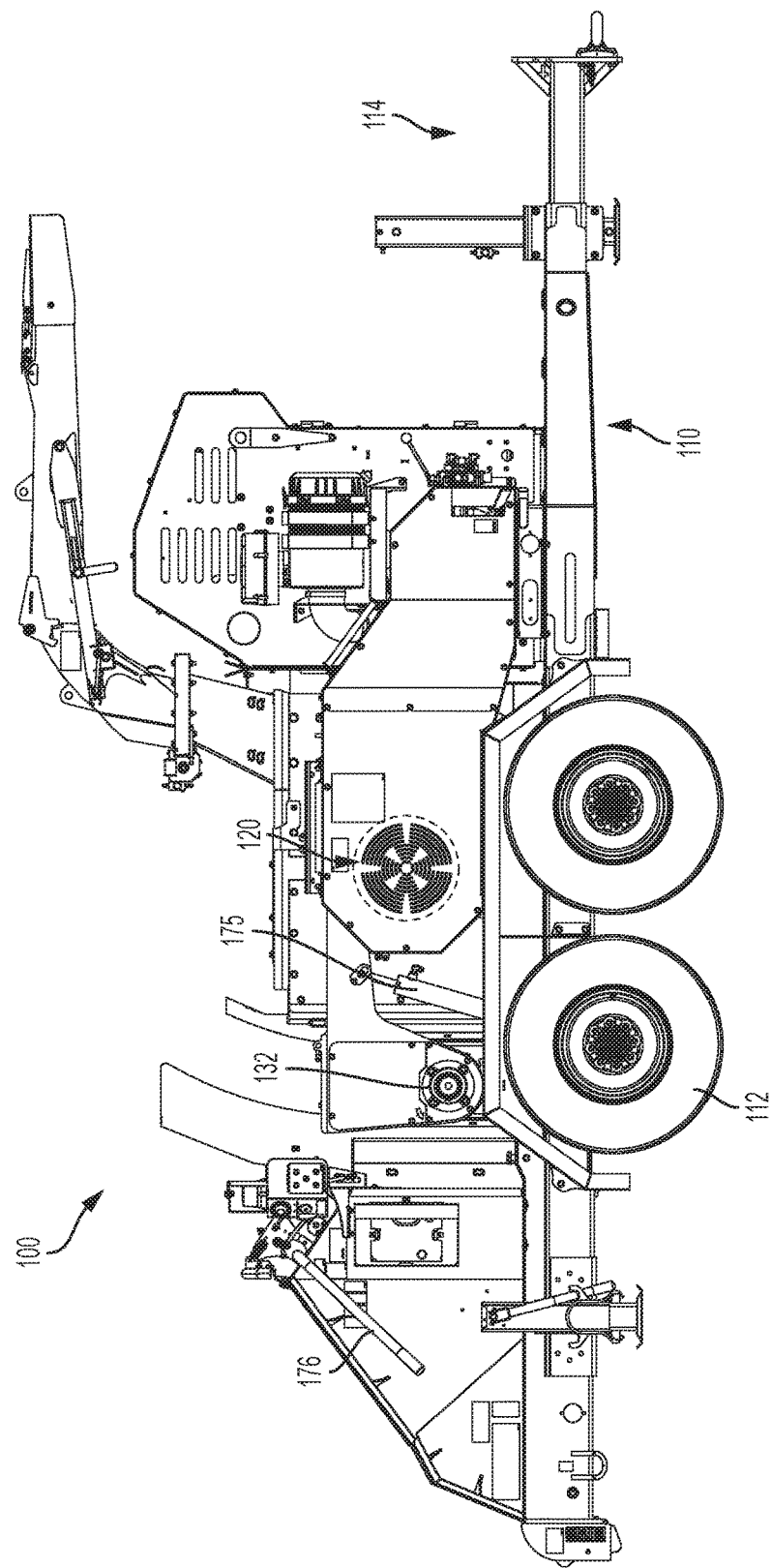
FIG. 2 is a side view of the chipper of FIG. 1, with portions removed for illustration.

Focusing now on controlling the direction of the feed roller 132, the operator control 176 may be a control bar as shown in FIG. 2, and may have four angular positions. In order, a first position may be a stop position at which the processor 170 does not operate the feed roller 132, a second position may cause the processor 170 to operate the feed roller 132 in a forward direction (via the directional control valve 164 and the motors 140, 150), a third position may be another stop position at which the processor 170 does not operate the feed roller 132, and the fourth position may cause the processor 170 to operate the feed roller 132 in a reverse direction (via the directional control valve 164 and the motors 140, 150). Other operator control devices 176 (e.g., levers, switches, dials, buttons, etc.) and positional configurations may of course be used, however.

While not required, it may be desirable for the processor 170 to default to operating the motors 140, 150 in series through the relational control valve 166. When additional torque is needed for the feed roller 132, operation of the motors 140, 150 may be manually or automatically adjusted such that the motors 140, 150 are powered in parallel. For manual adjustment, the user may instruct the processor 170 through the operator control 178 to actuate the motors 140, 150 in parallel (via the relational control valve 166). Once the additional torque is no longer desired, the user may instruct the processor 170 through the operator control 178 to actuate the motors 140, 150 in series (again, via the relational control valve 166). In some embodiments, the processor 170 may automatically return the motors 140, 150 to operating in series after a predetermined amount of time operating in parallel.

Figure 9B:
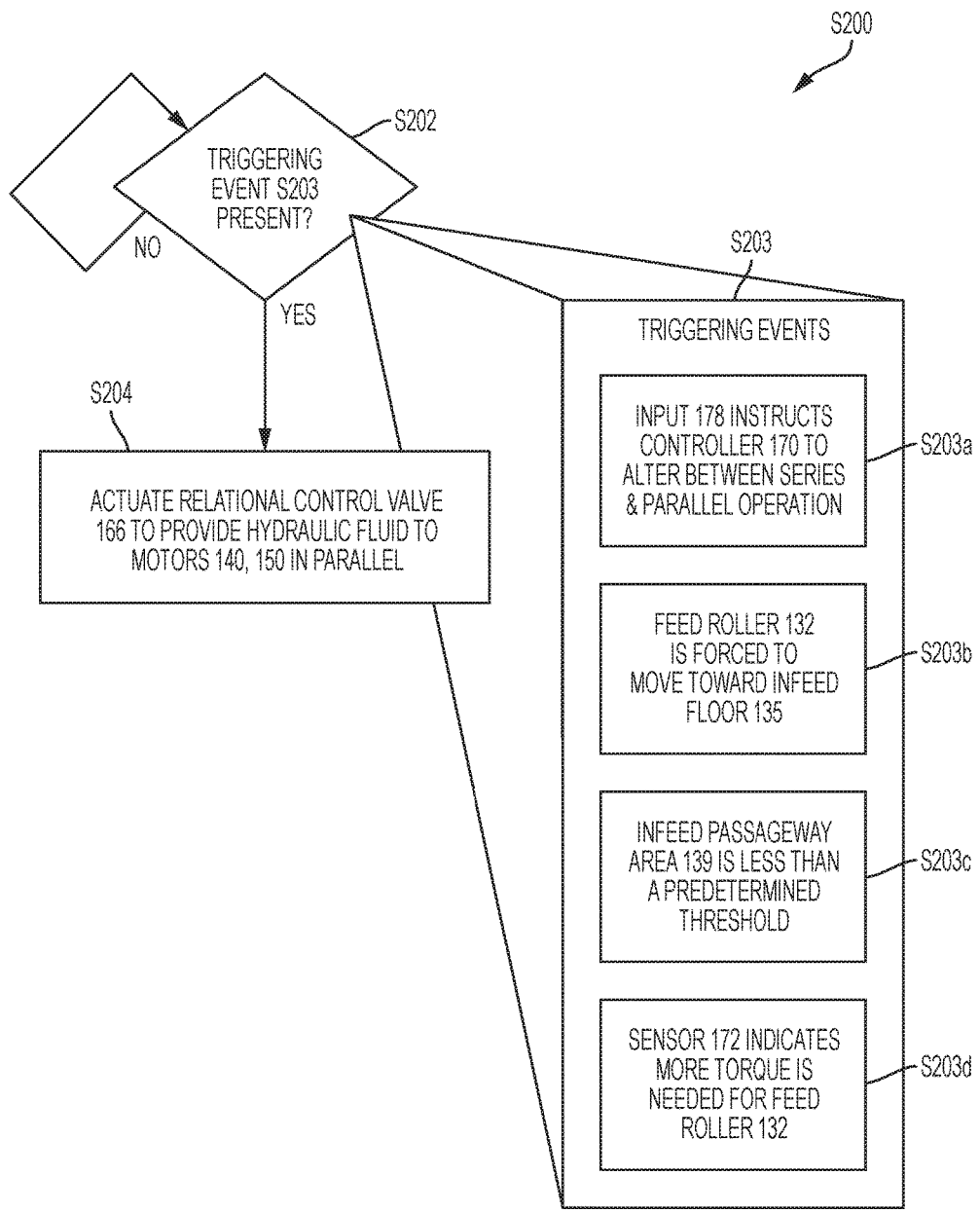

FIG. 9b shows example logic used by the processor 170 for adjusting operation of the motors 140, 150 from series to parallel operation, with process S200 starting at step S202. At step S202, the processor 170 determines if a triggering event S203 is present. If so, process S200 continues to step S204, where the processor 170 actuates the relational control valve 166 to provide hydraulic fluid to the motors 140, 150 in parallel. If not, the process S200 returns to step S202. FIG. 9b illustrates various triggering events S203a, S203b, S203c, S203d, and those skilled in the art will appreciate that other triggering events S203 may also be used. Further, an individual triggering event S203 may require multiple conditions to be present, such as each of: (a) the sensor 172 indicating that the feed roller 132 is raised due to material passing through the infeed portion 130, (b) the operator control 176 causing the feed roller 132 to operate in the forward direction, and (c) the processing portion 120 not engaging material as shown by a cutter speed sensor.

Triggering event S203a relates to manual control as discussed above. More particularly, the operator control 178 instructs the processor 170 to alter from series to parallel operation. Triggering event S203b occurs when the feed roller 132 is forced to move toward the infeed floor 135 by the cylinders 175, as discussed above. Triggering event 203c occurs when an infeed passageway area 139 (FIG. 3), defined between the feed roller 132 and the infeed floor 135, is less than a predetermined threshold. Triggering event 203d occurs when the sensor 172 indicates that more torque is needed for the feed roller 132. For example, the sensor 172 may detect that the feed roller 132 has been undesirably raised by the object being chipped.

Figure 9C:
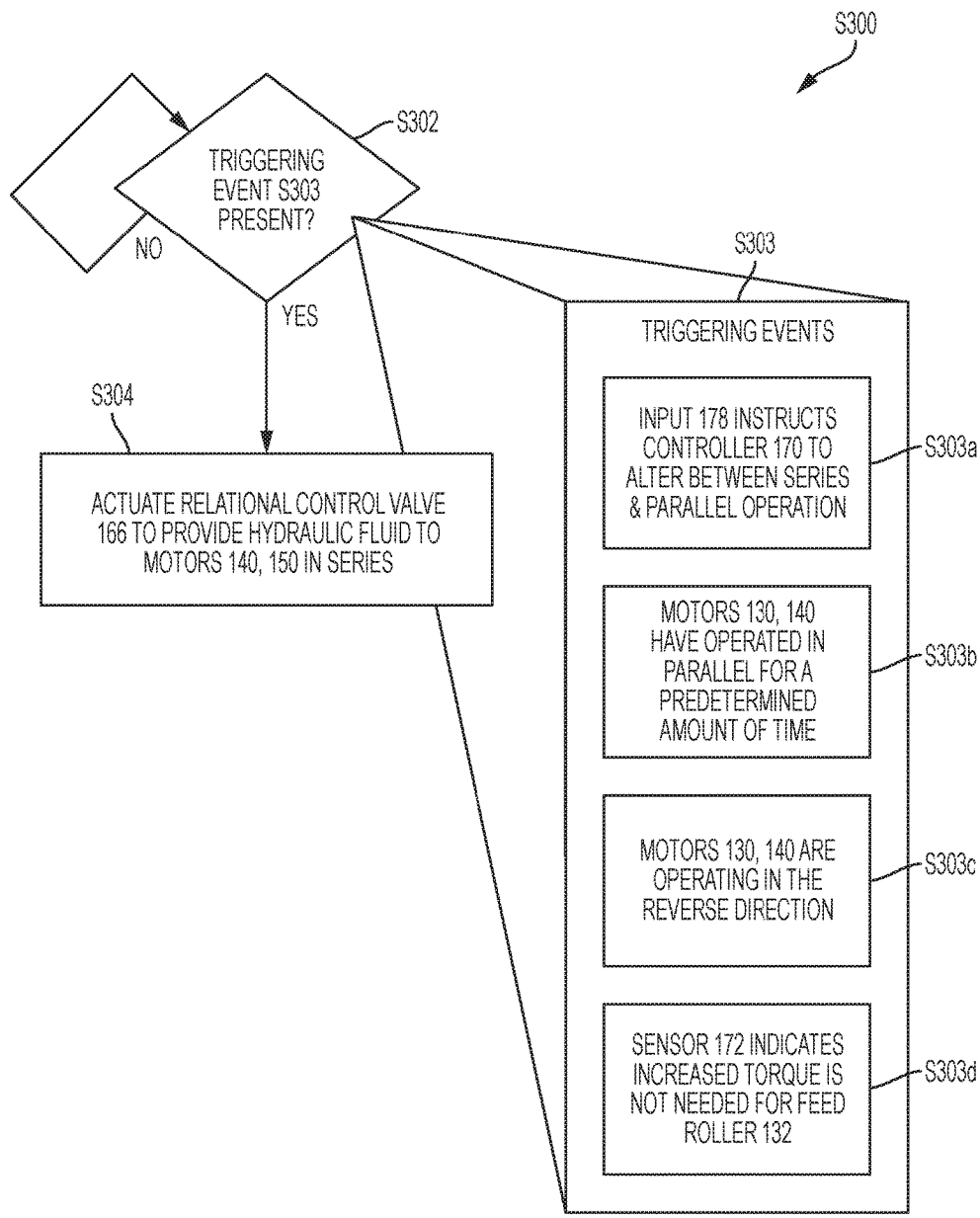

FIG. 9c shows example logic used by the processor 170 for adjusting operation of the motors 140, 150 from parallel to series operation, with process S300 starting at step S302. At step S302, the processor 170 determines if a triggering event S303 is present. If so, process S300 continues to step S304, where the processor 170 actuates the relational control valve 166 to provide hydraulic fluid to the motors 140, 150 in series. If not, the process S300 returns to step S302. FIG. 9c illustrates various triggering events S303a, S303b, S304c, S304d, and those skilled in the art will appreciate that other triggering events S303 may also be used.

Triggering event S303a again relates to manual control as discussed above. More particularly, the operator control 178 instructs the processor 170 to alter from parallel to series operation. Triggering event S303b occurs when the motors have operated in parallel for a predetermined amount of time. Triggering event 303c occurs when the motors 140, 150 are operated in the reverse direction; it may be desired to clear out any item in the infeed portion 130 as quickly as possible when operating in the reverse direction. Triggering event 303d occurs when the sensor 172 indicates that increased torque is not needed. Here, the sensor 172 may be a load sensor, a speed sensor, a pressure sensor, a current sensor, or a combination of multiple sensors, for example.

Figure 8B:
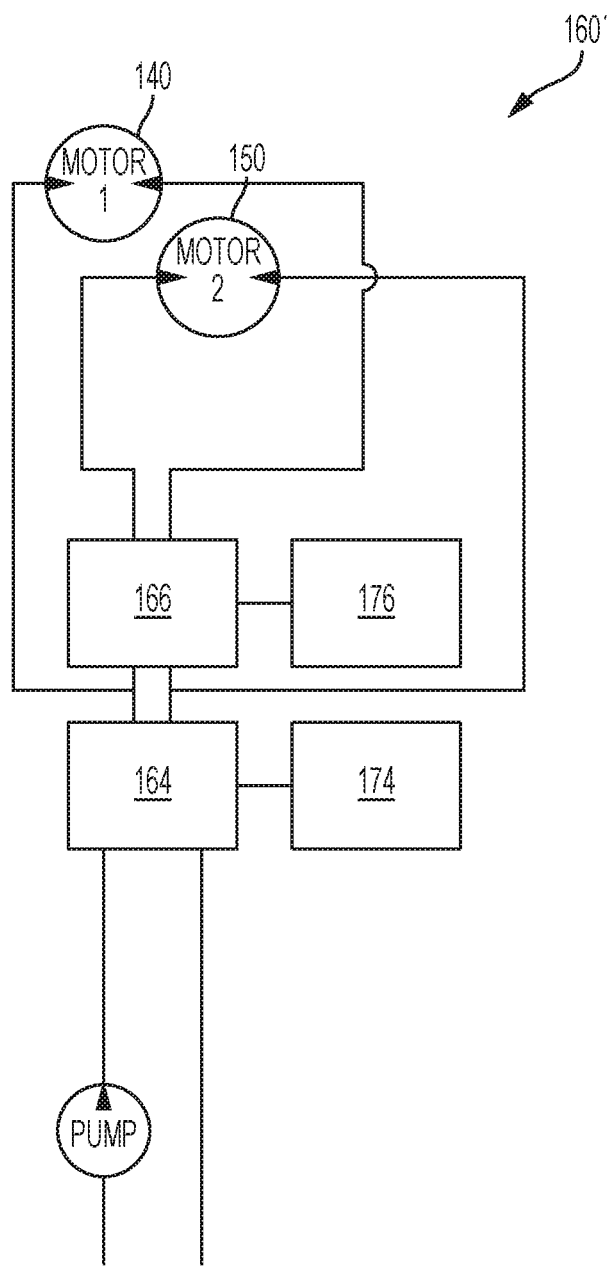
FIG. 8*b* is a schematic view of part of the infeed system from an alternate embodiment of the chipper of FIG. 1.

An alternate control system 160' is shown in FIG. 8b. The primary difference between the control system 160 and the control system 160' is that the control system 160' does not include the processor 170. Instead, the directional control valve 164 and the relational control valve 166 are controlled by the operator controls 174, 176 either directly or via solenoids. So if the control system 160' is used, the operator may simply control the directional control valve 164 and the relational control valve 166 manually through at least one lever, switch, dial, button, or other operator control. The height control for the feed roller 132 is not shown in FIG. 8b for simplicity, but height control may similarly be included in the control system 160'. For example, the operator control 174 may simultaneously actuate the relational control valve 166 and the valving 184; or the operator control 178 may actuate the valving 184.

FIG. 4 shows the chipper 100 in use with a tree 10. The tree 10 is moved along the infeed floor 135 to the feed roller 132, which moves the tree 10 to the processing portion 120. Operation of the chipper 100, including adjustment of the height, speed, and torque of the feed roller 132, is discussed above. In some embodiments, another feed roller is provided generally at the infeed floor 135 such that the tree or debris passes between two feed rollers before reaching the processing portion 120.

Figure 10:
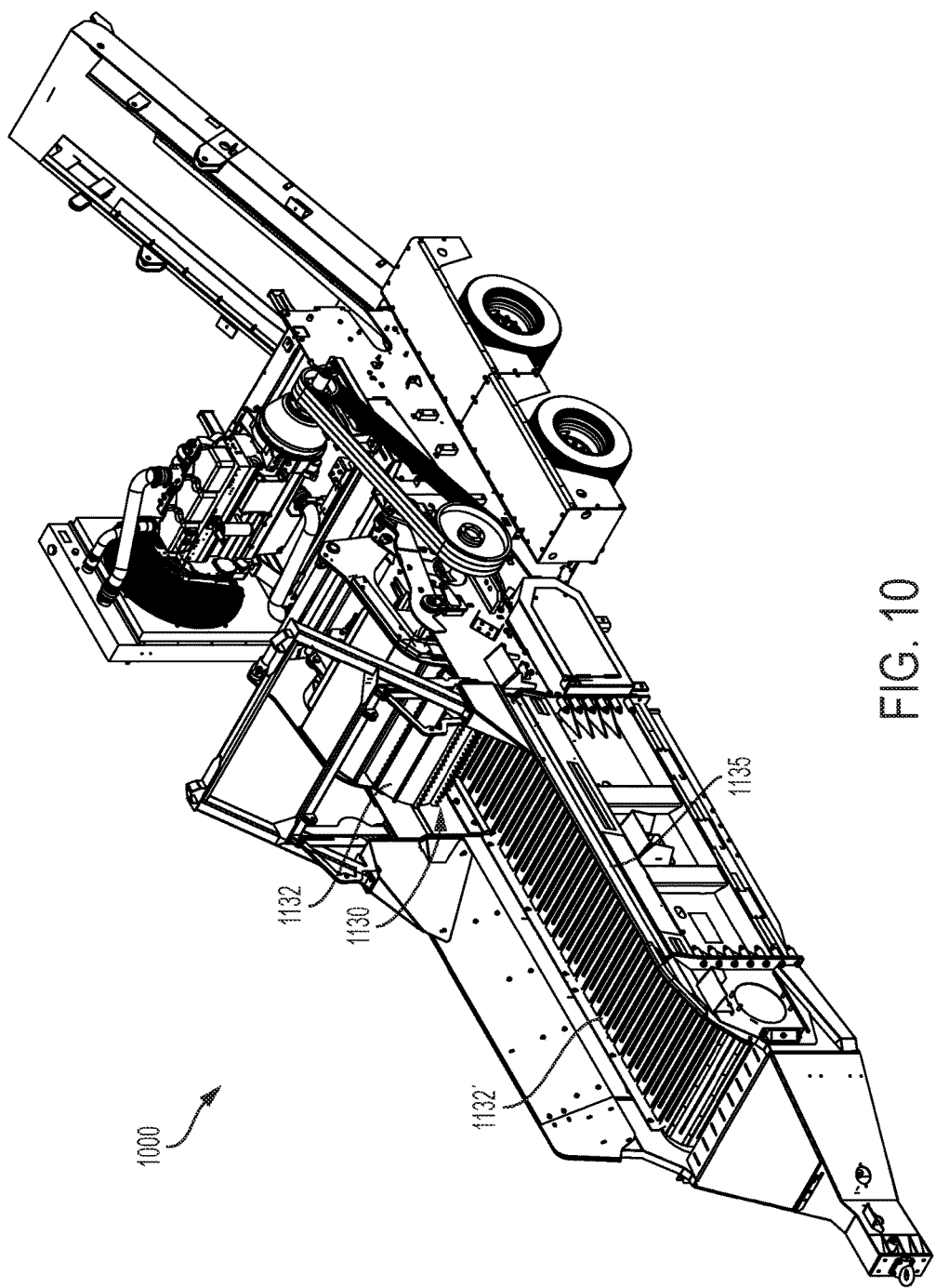
FIG. 10 is a perspective view of a grinder according to one embodiment of the current invention.
Figure 11:
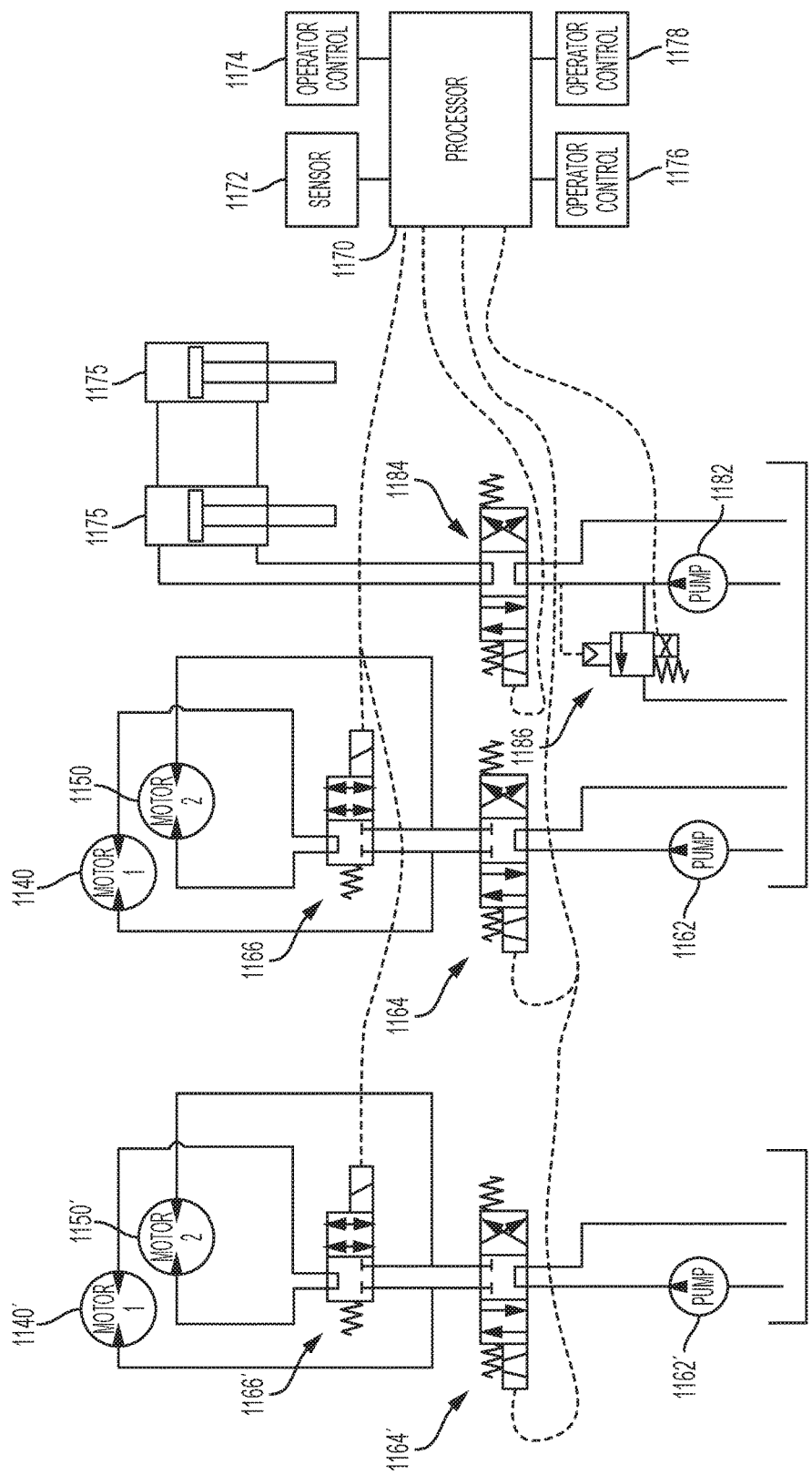
FIG. 11 is a schematic view of part of the infeed system from the grinder of FIG. 10.

FIGS. 10 and 11 show a grinder 1000 having a processing portion for crushing aggregate material into smaller pieces through repeated blows, and an infeed portion 1130 upstream that is substantially similar to the infeed portion 130 described above, except as specifically noted and/or shown, or as would be inherent. For uniformity and brevity, corresponding reference numbers may be used to indicate corresponding parts, though with any noted deviations.

The apparatus infeed portion 1130 primarily differs from the infeed portion 130 shown in FIGS. 1 through 9c by having a powered conveyor 1132' (i.e., another feed roller) at the infeed floor 1135 such that the aggregate material passes between the two feed rollers 1132, 1132' before reaching the processing portion. As shown in FIG. 11, the second feed roller 1132' may be operated in the same manner as the feed roller 1132 (e.g., by processor 1170 interacting with pumps 1162, 1162', directional control valves 1164, 1164,' and relational control valves 1166, 1166'), and the processor 1170 may adjust the valves 1164, 1164' in concert (i.e., together) and may adjust the valves 1166, 1166' in concert (i.e., together).

FIG. 12 schematically shows part of an infeed portion from an alternate embodiment of the chipper of FIG. 1 or an alternate embodiment of the grinder of FIG. 10. This infeed portion is substantially similar to the infeed portions 130, 1130 described above, except as specifically noted and/or shown, or as would be inherent. For uniformity and brevity, corresponding reference numbers may be used to indicate corresponding parts, though with any noted deviations.

Instead of having multiple motors 140, 150 which operate in parallel or series, the embodiment of FIG. 12 utilizes a variable displacement motor 140' which may be responsive to manual control and operating conditions similar to discussed above. For example, the discussion above teaches automatically reducing the rotational speed of the feed roller 132 and increasing the torque of the feed roller 132 when, among other things, there is an adjustment in an amount of down pressure applied on the feed roller 132. The embodiments discussed above arrive at the reduced rotational speed and increased torque by switching from series operation of the motors 140, 150 to parallel operation of the motors 140, 150. In the embodiment of FIG. 12, the processor 170 causes the displacement of the motor 140' to change when the down pressure on the feed roller 132 is increased, such that the motor 140' operates at a reduced RPM and an increased torque.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention. It will be understood that certain features and subcombinations are of utility and may be employed without reference to other features and subcombinations and are contemplated within the scope of the claims. The specific configurations and contours set forth in the accompanying drawings are illustrative and not limiting.

The invention claimed is:

1. An infeed system for a chipper or grinder, the chipper or grinder having a processing portion wherein an item is processed into smaller pieces, the infeed system being upstream of the processing portion and comprising:
   a feed roller;
   a first hydraulic motor in communication with the feed roller for selectively actuating the feed roller;
   a second hydraulic motor in communication with the feed roller for selectively actuating the feed roller;
   an operator control configured to increase a crush force applied by the feed roller; and
   a control system for selectively providing hydraulic fluid to the first and second hydraulic motors in series or in parallel;
   wherein the control system automatically switches from providing the hydraulic fluid to the first and second hydraulic motors in series, to providing the hydraulic fluid to the first and second hydraulic motors in parallel, when the operator control is triggered to increase the crush force applied by the feed roller.

2. The infeed system of claim 1, wherein:
   the control system includes a processor, at least one pump, and at least one valve; the at least one valve being controlled by the processor to selectively:
   (a) provide the hydraulic fluid to the first and second hydraulic motors in series;
   (b) provide the hydraulic fluid to the first and second hydraulic motors in parallel; or
   (c) prevent the hydraulic fluid from operating the first and second hydraulic motors.

3. The infeed system of claim 1, wherein the feed roller can move toward an infeed floor of the infeed system upon triggering of the operator control.

4. The infeed system of claim 1, wherein the infeed system includes a hydraulic cylinder that controls a position of the feed roller.

5. An infeed system for a chipper or grinder, the chipper or grinder having a processing portion wherein an item is processed into smaller pieces, the infeed system being upstream of the processing portion and comprising:
   a feed roller;
   a first hydraulic motor in communication with the feed roller for selectively actuating the feed roller;
   a second hydraulic motor in communication with the feed roller for selectively actuating the feed roller;
   a hydraulic pump for providing hydraulic fluid to the first and second hydraulic motors;
   a directional control valve between the hydraulic pump and the first and second hydraulic motors, the directional control valve allowing the hydraulic fluid to operate the first and second hydraulic motors in a forward direction and in a reverse direction;
   a relational control valve between the hydraulic pump and the first and second hydraulic motors, the relational control valve allowing the hydraulic fluid to operate the first and second hydraulic motors in series or in parallel;
   a processor in data communication with the directional control valve to selectively actuate the directional control valve, the processor being in data communication with the relational control valve to selectively actuate the relational control valve; and
   an operator control in data communication with the processor, the operator control configured to increase a crush force applied by the feed roller;
   wherein the processor automatically actuates the relational control valve to change from operating the first and second hydraulic motors in series, to operating the first and second hydraulic motors in parallel, when the operator control is triggered to increase the crush force applied by the feed roller.

6. The infeed system of claim 5, the processor actuating the directional control valve to operate the first and second hydraulic motors in the forward direction upon receiving a forward-drive output from the operator control, the processor actuating the directional control valve to operate the first and second hydraulic motors in the reverse direction upon receiving a reverse-drive output from the operator control.

7. An infeed system for a chipper or grinder, the chipper or grinder having a processing portion wherein an item is processed into smaller pieces, the infeed system being upstream of the processing portion and comprising:
   a feed roller;
   a motor in communication with the feed roller for selectively actuating the feed roller;
   a control system selectively actuating the motor at a first operational mode and a second operational mode, the motor having an increased speed output when at the first operational mode relative to when at the second operational mode, the motor having a decreased torque output when at the first operational mode relative to when at the second operational mode, the control system automatically switching from the first operational mode to the second operational mode when an operator control is triggered to increase a crush force applied by the feed roller.

8. The infeed system of claim 7, wherein the motor is a hydraulic motor selected from the group consisting of a variable displacement motor and a fixed displacement motor.

9. The infeed system of claim 8, wherein the motor includes first and second hydraulic motors configured to be operated in series when in the first operational mode and in parallel when in the second operational mode.

10. The infeed system of claim 9, wherein the infeed system further includes
   a hydraulic pump for providing hydraulic fluid to the first and second hydraulic motors;
   a directional control valve between the hydraulic pump and the first and second hydraulic motors, the directional control valve allowing the hydraulic fluid to operate the first and second hydraulic motors in a forward direction and in a reverse direction;
   a relational control valve between the hydraulic pump and the first and second hydraulic motors, the relational control valve allowing the hydraulic fluid to operate the first and second hydraulic motors in series or in parallel; and
   a processor in data communication with the directional control valve to selectively actuate the directional control valve, the processor being in data communication with the relational control valve to selectively actuate the relational control valve.

11. The infeed system of claim 7, wherein the infeed system further includes a hydraulic cylinder that controls a position of the feed roller.

12. The infeed system of claim 7, wherein the infeed system includes an opposing structure opposite the feed roller.

13. The infeed system of claim 12, wherein the opposing structure is an infeed floor of the infeed system.

14. The infeed system of claim 13, wherein the infeed floor includes a roller.

15. An infeed system for a chipper or grinder, the chipper or grinder having a processing portion wherein an item is processed into smaller pieces, the infeed system being upstream of the processing portion and comprising:
   a feed roller;
   a positioning system configured to position the feed roller relative to an opposing structure to adjust a crush force applied by the feed roller;
   a motor configured to rotate the feed roller, the motor having a first operational mode and a second operational mode; and
   a control system configured to automatically switch motor operation from the first operational mode to the second operational mode to increase a torque capacity provided by the motor to the feed roller when an adjustment is made to increase the crush force.

16. The infeed system of claim 15, wherein the opposing structure is an infeed floor of the infeed system.

17. The infeed system of claim 16, wherein the infeed floor includes a roller.

18. The infeed system of claim 15, wherein the motor includes first and second hydraulic motors configured to be operated in series before the adjustment is made and to be operated in parallel when the adjustment is made.

19. The infeed system of claim 18, wherein the infeed system further includes
   a hydraulic pump for providing hydraulic fluid to the first and second hydraulic motors;
   a directional control valve between the hydraulic pump and the first and second hydraulic motors, the directional control valve allowing the hydraulic fluid to operate the first and second hydraulic motors in a forward direction and in a reverse direction;
   a relational control valve between the hydraulic pump and the first and second hydraulic motors, the relational control valve allowing the hydraulic fluid to operate the first and second hydraulic motors in series or in parallel; and
   a processor in data communication with the directional control valve to selectively actuate the directional control valve, the processor being in data communication with the relational control valve to selectively actuate the relational control valve.

20. The infeed system of claim 15, wherein the positioning system includes a hydraulic cylinder that controls a position of the feed roller.

21. The infeed system of claim 15, wherein the motor is a variable displacement motor.

22. The infeed system of claim 15, wherein the adjustment is made manually by an operator control.

* * * * *